United States Patent [19]
Dicken, Jr.

[11] 3,768,507
[45] Oct. 30, 1973

[54] FLOW CONTROL DEVICE
[75] Inventor: John A. Dicken, Jr., Louisville, Ky.
[73] Assignee: General Electric Company, Louisville, Ky.
[22] Filed: July 2, 1971
[21] Appl. No.: 159,238

[52] U.S. Cl.................. 137/504, 137/517, 138/45
[51] Int. Cl............................................. F15d 1/08
[58] Field of Search.................... 138/43, 45, 46; 137/517, 504, 525, 525.1; 251/333, 37

[56] References Cited
UNITED STATES PATENTS

| | | | |
|---|---|---|---|
| 2,728,355 | 12/1955 | Dahl | 138/45 |
| 2,948,300 | 8/1960 | Fraser | 137/517 X |
| 2,857,131 | 10/1958 | Cole | 251/333 X |
| 3,194,272 | 7/1965 | Kogan et al. | 138/43 |
| 3,474,831 | 10/1969 | Noakes | 138/43 |
| 2,728,355 | 12/1955 | Dahl | 138/45 |
| 2,936,790 | 5/1960 | Dahl et al. | 138/46 |

FOREIGN PATENTS OR APPLICATIONS

| | | | |
|---|---|---|---|
| 1,227,296 | 10/1966 | Germany | 251/333 |

Primary Examiner—Henry T. Klinksiek
Attorney—George C. Atwell et al.

[57] ABSTRACT

A fluid flow control device maintains substantially vibration-free and substantially constant volumetric fluid flow through a fluid passage despite fluid supply pressure variations. The device is a resilient plate or disk operable in combination with a seat disposed between a fluid inlet and outlet. The resilient plate has internal fluid passages through its body thickness and spaced-apart peripheral grooves serving as external fluid passages. Bypass pads are provided on the face of the plate disposed toward the seat whereby fluid flow paths are established therebetween. The bypass pads are disposed non-symmetrically on the plate face such that deflection of the plate and/or compression of the pads is non-uniform. The closing of external routes for fluid passage around the plate therefore occurs sequentially rather than simultaneously.

8 Claims, 6 Drawing Figures

PATENTED OCT 30 1973 3,768,507

INVENTOR.
JOHN A. DICKEN JR.
BY George C. Atwell
HIS ATTORNEY

FLOW CONTROL DEVICE

BACKGROUND OF THE INVENTION

This invention relates to fluid flow control devices operable to maintain a substantially constant volumetric flow through a passage during large variations in pressure drop across the passage. Devices of this nature find a multiplicity of applications in standard valve systems. An example of the proposed use for the present invention is a solenoid operated shut-off valve in the water supply system of a washing machine. Analogous uses occur in any apparatus which requires a relatively constant flow rate despite pressure changes.

Previous attempts at maintaining a constant flow rate through a passage despite pressure variations have utilized resilient disks of various configurations. The disk is disposed within a chamber in the passage, the chamber comprising an inlet, an outlet, and a flat shoulder or seat disposed between the inlet and the outlet. The resilient disk, which reacts with the shoulder or seat by forming a seal thereagainst, generally has at least one cut-out for hole through the body of the disk forming a conduit for the passing of fluid through the disk. The disk presents a flat face to the seat and all fluid flow is routed through the conduits in the disk. As fluid pressure in the supply line increases, the resilient disk is deformed by this pressure, and the hole or conduit cross-section is constricted proportionately to pressure increase. This constriction counteracts the pressure increase and substantially constant flow is maintained. In application, the device successfully maintains a substantially constant flow rate when subjected to a large pressure drop, but when a comparatively smaller pressure drop occurs the device unduly restricts the flow such that the desired rate is only regained after some delay.

Later devices utilize resilient disks in the same general combination as described heretofore, but with the added feature of a number of protrusions or bypass pads disposed around the face of the disk which abuts the seat or shoulder. The spaces between these bypass pads supply additional routes for fluid flow under low supply pressures. Under low pressures the fluid can flow through the disk by means of conduits therethrough and around the disk by means of the spaces between the bypass pads, the disk face and the seat. At substantially higher pressures, the bypass pads are completely compressed by the force of the fluid pressure against the disk, and the entire perimeter of the face of the disk becomes pressed against the seat thereby cutting off the additional fluid flow routes and relegating the entire flow to the conduits through the disk. At higher pressures than that at which the total compression of the bypass pads occurs, the disk functions substantially as does the disk having no pads as discussed previously herein. This type of device increased the functionality of the apparatus under low pressures and does not hinder its effectiveness at high pressures.

The latter device is considered objectionable because undesirable vibrations and noise phenomena are perceptible when the device is subjected to pressure drops ranging near the pressure drop at which all of the bypass pads become fully compressed. The vibrations take the form of pressure waves in the fluid within the passage as a result of the sudden constriction of flow area through the chamber due to the simultaneous collapsing of all the bypass pads closing off all additional routes for the fluid flow around the disk in a single instant.

The constriction of the additional flow routes is enhanced by the venturi effect between the bypass pads. Flow through the additional routes increases in velocity as the routes become constricted, whereby the pressure drop thereacross is further increased causing complete compression of the pads and total constriction of the additional routes. The subsequent sudden cessation of flow through the additional routes creates a pressure wave and also changes the local pressure by cancelling out the aforementioned venturi effect. Thus the pads are able to expand until new flow past them re-initiates the venturi effect, whereupon a total constriction again occurs, with an attendant pressure wave. The sequence recurs until the supply pressure is sufficient to preclude expansion of the bypass pads after their total compression. In addition, if the length of the fluid passage is such that the frequency of wave propagation in the fluid approximates the natural frequency of constriction of the additional routes, the amplitude of vibrations will increase as additional waves are created.

The vibrations initiated in this manner create irritating noise and the possibility of resonant shock damage to the apparatus. The present invention eliminates the occurrence of the vibrations by removing the simultaneous total constriction of the additional routes and, instead, provides means for restraining preselected portions of the disk from deflection responsive to the variation in fluid supply pressure.

It is therefore an objective of this invention to provide an improved flow control device.

It is a more specific objective of this invention to provide a flow control device having the capacity to maintain a substantially constant volumetric fluid flow through a passage without overly restricting low-pressure flow.

A further objective of this invention is to provide an improved fluid flow device which precludes harmful noise and vibrational characteristics over a wide range of pressure variations.

It is also an objective of this invention to provide a fluid flow control device comprising a resilient disk having bypass pads adapted to compress sequentially rather than uniformly.

SUMMARY OF THE INVENTION

In order to accomplish the foregoing objectives and others which will become apparent hereinafter, it is proposed in one form of this invention to supply a flow control device comprising a resilient, deformable plate or disk disposed within a chamber of a passage, with the disk having internal and external flow routes, a predetermined thickness, and a plurality of bypass pads disposed to separate a shoulder or seat from the face of the disk adjacent thereto. The bypass pads are adapted to sequentially allow portions of the face to contact the seat and thereby gradually close off the external flow routes as pressure gradually increases. For this purpose, the bypass pads of the present invention are disposed about the face in a non-symmetrical manner. In order to provide this non-symmetrical disposition, the bypass pads are formed such that one or more of the following parameters is not uniform: the thickness of pads, the cross-sectional area of the pads, or the spacing between the pads. Due to this non-uniformity, the pads will undergo different degrees of compression under a given fluid pressure and will thus collapse sequentially and allow the face of the disk to contact the shoulder a portion at a time as pressure increases.

DETAILED DESCRIPTION OF THE PREFERRED EMBODIMENT

Figure 1:
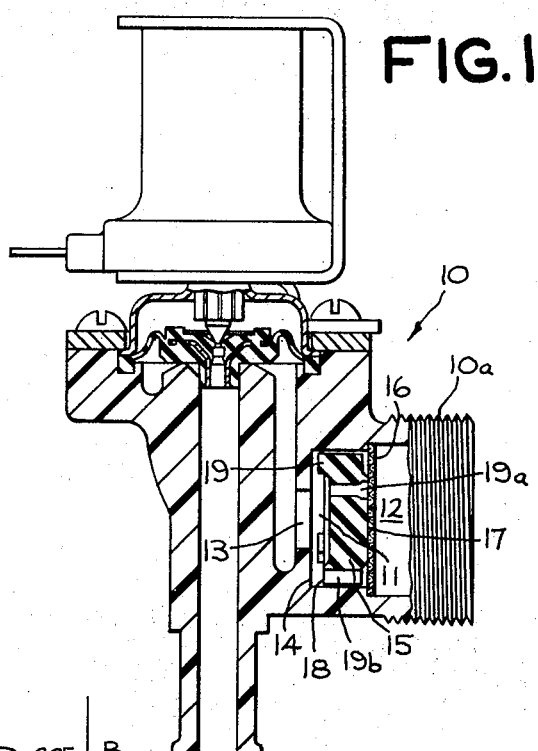
FIG. 1 is a cross-sectional view of a common solenoid valve embodying the present invention.

Referring to FIG. 1, an application of the present invention may be observed. In this figure, the invention is shown in conjunction with a solenoid valve, generally designated by 10, which has threaded portion 10a for attachment to a fluid supply line or passage. The passage within the valve has a chamber 11 comprising an inlet side or opening 12, an outlet side or opening 13 of a smaller cross-section as compared to the inlet side 12, and an annular shoulder or seat 14 disposed between the inlet and outlet of the chamber. The resilient plate or disk 15 of the invention is placed within the chamber whereby it substantially fills the chamber and loosely abuts shoulder 14. A mesh filtering screen 16 may be utilized in the passage on the upstream side of the plate 15. The plate 15 is of such perimetrical configuration that it substantially fills the cross-section of the inlet 12 and overlies the shoulder 14. Plate 15 comprises a first face 17 disposed toward the inlet 12 and second face 18 disposed toward the outlet 13 and shoulder 14. The disk further comprises a plurality of bypass pads 19 which cooperate with said second face 18 and abut said shoulder 14. In addition the disk has internal conduits 19a from the first face to the second face through the disk and external grooves 19b in the outer perimeter between the first face and the second face which together form additional flow paths or routes through the chamber past the disk 15.

Figure 2:
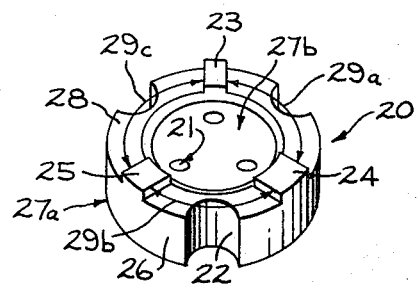
FIG. 2 is a perspective view of a resilient disk of the present invention in a first embodiment.

FIG. 2 discloses a first embodiment of the resilient disk of the present invention. The resilient disk generally designated by 20 has a plurality of internal conduits 21 through its central portion and a plurality of external grooves 22 in its circumference 26, which together form additional routes for fluid flow between first face 27a and second face 27b of the disk 20. Second face 27b of the disk 20 is adapted to be disposed toward the seat 14 discussed above. This second face 27b carries a raised annulus 28 which is dimensioned and disposed to form a seal with the seat 14 when the two are brought into contact, thereby precluding the flow of fluid around disk 20 through the external grooves 22 so as to allow flow only through internal conduits 21. This raised annulus has a plurality of bypass pads or protrusions 23, 24 and 25 thereon. The bypass pads in this first embodiment are uniform in thickness. They are spaced equally apart by perimetrical distances 29a, 29b and 29c around the perimeter of the second face 27b. As is apparent from FIG. 2, these bypass pads 23, 24 and 25 differ from one another in their cross-sectional areas, pad 24 having the largest area, followed by pad 25, with pad 23 having the smallest area. Since the compression of given objects made from the same material is proportional to the thicknesses and cross-sectional areas of the different bodies as well as to the force applied thereto, according to the relationship:

$$Ca\ FL/A/M$$

wherein $C$ is the compression of the object,
$F$ is the axial force upon the object,
$A$ is the cross-sectional area of the object,
$M$ is the modulus of the material, and
$L$ is the thickness of the material, and it is apparent that bodies having a larger cross-sectional area will resist compression to a greater degree than those having smaller cross-sectional area. Therefore with bypass pads 23, 24 and 25 as they are dimensioned in FIG. 2, it may be seen that when equal and equally-increasing forces are applied to the three, pad 23 will entirely collapse first, pad 25 second and pad 24 third.

Figure 3:
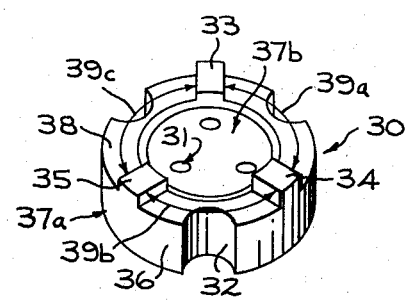
FIG. 3 is a perspective view of a resilient disk of the present invention in a second embodiment.

FIG. 3 shows a resilient disk similar to that in FIG. 2, but which discloses a second embodiment of the present invention. In FIG. 3, resilient disk or plate 30 carries internal conduits 31, external grooves 32, bypass pads 33, 34 and 35, and perimetrical distances 39a, 39b and 39c between the bypass pads. In this second embodiment it may be seen that, while the cross-sectional areas and perimetrical distance between bypass pads 33, 34 and 35 are substantially uniform, the thickness of the bypass pads are not uniform, the thickness of pad 34 being greater than that of pad 35 which in turn is greater than that of pad 33. Under equal and equally-increasing force, pad 33 will collapse first, pad 35 second and pad 34 third.

Figure 4:
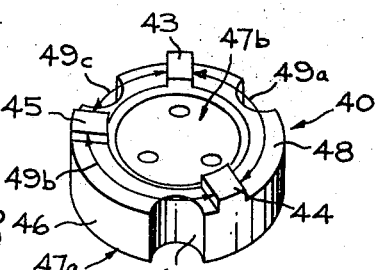
FIG. 4 is a perspective view of a resilient disk of the present invention in a third embodiment.

Referring now to FIG. 4, a third embodiment of the present invention is disclosed. In this embodiment, resilient disk 40 has internal conduits 41, external grooves 42, bypass pads 43, 44 and 45, outer perimeter 46, first face 47a, second face 47b, raised annulus 48 on the second face and perimetrical distance between bypass pads 49a, 49b and 49c. In this embodiment the cross-sectional areas of the bypass pads and the thicknesses of the bypass pads are substantially uniform; however, the placement of the bypass pads is such that 49a, (the perimetrical distance between bypass pads 43 and 44) is greater than 49b (the perimetrical distance between bypass pads 44 and 45) which is in turn greater than 49c (the perimetrical distance between bypass pads 45 and 43). When a uniform pressure is applied across the disk face, unequal deflection will occur between the pads due to the placement of the pads in this assymetrical fashion. Also, the greatest force will be applied to bypass pad 44, the next greatest to bypass pad 43 and the smallest to bypass pad 45. Once again, applying the relationship discussed above, it may be seen that pad 44 will compress first followed by 43 and pad 45 will be compressed last. In addition, the resilient disk deforming non-uniformly between the bypass pads results in the annular rim 48 being drawn into contact with the seat in a non-uniform fashion.

It is to be noted that while the three embodiments discussed above hold two of the three parameters (thickness, cross-sectional area and force) substantially uniform throughout the plurality of bypass pads while allowing the third to vary, this is not a limitation; and similar asymmetrical compression of the pads and deflection of the disk therebetween may be attained by varying more than one of said parameters throughout the bypass pads on a given disk.

In addition, it is apparent that the resilient disk need not be circular. This configuration is determined only by the cross-sectional shape of the chamber inlet, and the need to overlie the seat or shoulder therein in a sealing relationship. Further, the use of a raised annular rim as a seal around the abutting disk face is optional. Any sealing shape may be used. In addition, alternative embodiments might utilize compressible protrusions not carried by the disk face, but rather detached therefrom and cooperating therewith, as for example, carried by a separate annular washer placed in abutment therewith.

Figure 5:
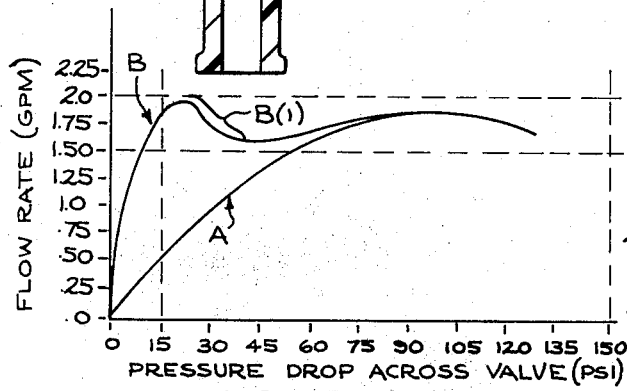
FIG. 5 is a graph of the volumetric flow rate through the passage as a function of the pressure drop across the passage for devices of the prior art.
Figure 6:
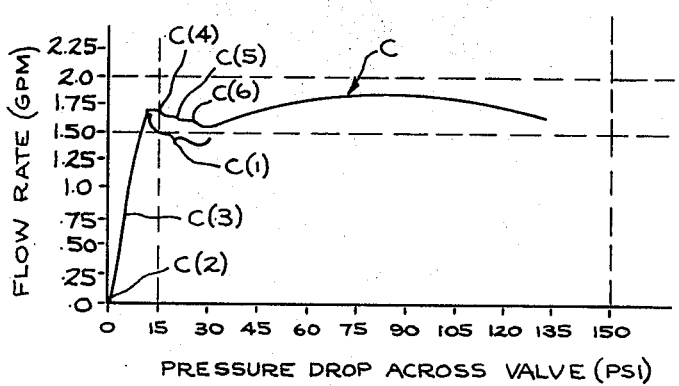
FIG. 6 is a graph of flow versus pressure drop for the device of the present invention.

FIG. 5 shows performance graphs of flow control devices of the prior art. FIG. 6 shows that of a device formed according to the present invention. Each graph is a plot of flow rates as a function of pressure drop across the device. Curve A shows the performance of a flow control device utilizing a deformable resilient plate or disk in a chamber similar to those utilized in the present invention with the difference that the plate or disk of curve A has no bypass pads, but rather continuously abuts the shoulder or seat in the chamber with its entire perimetrical portion thereby precluding flow around the disk at all pressures. The only flow past this disk occurs through conduits formed in the disk. It may be seen from graph A that, as discussed above, flow rates are inordinately restricted at low pressures, and a substantial flow is not reached until a large pressure drop is imposed upon the device.

Curve B shows the performance of a flow control device of the prior art which utilizes symmetrical bypass pads for allowing fluid flow around the disk or plate at low pressure drops across the device. It may be seen from curve B that a substantial flow is quickly attained at low pressure drops across the device. It may also be seen that, as curve B reaches a maximum and the slope of the curve becomes negative in the vicinity of portion B(1), that the flow rate decreases as pressure drop increases. It is in this area of the curve that the aforementioned undesirable vibration and noise occurs in the flow. This vibration and noise is an ultimate product of the sharpness of the negative slope of the curve at B(1) which arises due to the simultaneous collapsing of all the bypass pads of a prior art resilient disk or plate.

Curve C represents the functioning and performance of the flow control device according to the present invention. It may be seen from the figure that the negative portion of curve C, portion C(1), is broken up into a series of steps, no step having as great a negative slope as B(1) of the curve of the prior art device. As a result, the undesired vibration is eliminated from the present device.

A summary of the function of the flow control device of the present invention under various pressure applications with reference to FIGS. 5 and 6 can now be considered. The operation of the device will be similar throughout the three embodiments disclosed in FIGS. 2, 3 and 4, and therefore it is only necessary to discuss the operation of one of these embodiments.

It should be assumed that disk 20 has been placed within chamber 11 of solenoid valve 10 of FIG. 1, in an orientation such that bypass pads 23, 24 and 25 overlie and loosely abut portions of seat 14. It should be further assumed that threaded portion 10a of valve 10 has been attached to a fluid source, from which the fluid is initially at zero flow and zero pressure drop across the valve. This corresponds to the point C(2) at the origin of curve C in FIG. 6 at which point the pressure drop and flow rate are both zero.

As the fluid source is actuated, fluid begins to flow into inlet 12 of chamber 11 at a low flow rate and a small pressure drop. This initial action will cause a pressure to be exerted on face 27a and resilient disk 20 to be pushed against shoulder or seat 14 with a slight force. This slight force is counteracted by a negligible deflection of the bypass pads 23, 24 and 25. During this first period, some of the fluid flows through conduits 21. The fluid also flows around the disk 20 by means of perimetrical grooves 22, and past the seat through the outlet 13 via the spaces between the bypass pads. In this manner additional flow routes are set up through the aforementioned conduits 21 and grooves 22, the various flows joining at the chamber outlet 13 and continuing through the valve 10.

As the flow rate and pressure of the fluid from the fluid source increase, the flow rate through the valve and the pressure drop across the valve increase. The pressure exerted upon face 27a of disk 20 forces the disk more tightly against seat 14, and bypass pads 23, 24 and 25 begin to deflect substantially. The deflection of these pads, as discussed above, will not be uniform due to the inequality of the cross-sectional areas of the pads as shown in the first embodiment. This state of flow is exemplified by point C(3) on curve C of FIG. 6. Due to the non-symmetrical deflection of the bypass pads, the spaces between pads through which flow may pass are non-symmetrically constricted. To be specific, the area between pads 23 and 25 will be constricted more than that between 23 and 24 which is, in turn, more constricted than that between 24 and 25.

As the flow rate and pressure drop continue to increase, larger deflections of the bypass pads occur, until a status represented by point C(4) on curve C of FIG. 5 is reached. At this point the pressure drop across the device is such that the force transmitted to the bypass pads is sufficient to compress the pads 23 and 25 to such an extent that the areas between pads 23 and 25 has been constricted to zero; that is, that the raised annular rim 28 of the disk is now in contact with shoulder 14 throughout the space between pads 23 and 25 precluding fluid flow between these pads. Evidence of this action is apparent in the FIG. 6 graph for, at the point C(4), the flow rate across the device ceases to increase as the pressure drop across the device continues to increase. Further increases in pressure drop serve to further constrict the areas betweem pads 23 and 24 and between pads 24 and 25 thereby setting up a first negative step in the curve portion C(1).

As the pressure drop continues to increase, a condition is reached at point C(5) wherein bypass pads 23 and 24 have been compressed and the annular rim 28 between these pads is now fully in contact with the area of shoulder or seat 14 between said pads, thereby precluding flow through this area. At this point, as may be seen from FIG. 6, a second step in the negative step of curve portion C(1) is initiated.

In like fashion, as the pressure further increases upon face 27a, the remaining area for flow around the disk by means of external groove 22 is constricted until all three of the bypass pads are completely compressed and the raised annular rim 28 of face 27b engages seat 14. This corresponds to point C(6) on curve C in FIG. 6. From the foregoing it can be seen that the above arrangement of the bypass pads sequentially restrains preselected portions of the deformable plate from deflection responsive to changes in the fluid supply pressure. Further increases in the pressure drop across the device relegate all fluid flow to the conduits or holes 21 through the body of the disk 20.

During this entire process, conduits 21 have been constricting as disk 20 has been flattening out under the pressure of the fluid. This process will continue as the pressure drop continues to increase, thereby maintaining a substantially constant flow despite pressure drop variations as shown in FIG. 5.

The foregoing example of the operation of the first embodiment of the present invention may easily be analogized to the operation of the second and third embodiments. In each case, the bypass pads of the disk are compressed or deflection between the pads increased in a non-symmetrical manner such that portions of the raised annular rim on the outlet face of the disk are sequentially brought into contact with the shoulder or seat thereby precluding flow between the pads in the same sequential fashion. In each case, the negative slope portion C(1) of curve C in FIG. 6 will be stepped as shown in the FIGURE, and no step will have a large negative slope.

Although the present invention has been discussed with respect to the aforementioned three embodiments, it is to be understood that modifications and variations may be effected in the present invention without departing from the scope of the novel concepts thereof as particularly defined in the appended claims.

I claim:

1. In a flow control device having a flow passage and a resilient flow control disc adapted for pressure-responsive flexure against a seat in said passage, wherein said disc has at least one flow opening between first and second faces thereof and said first face is oriented toward said seat, and said disc has a plurality of edge grooves spaced apart about the disc perimeter to serve as flow routes for maintaining substantially constant volumetric flow through the passage during variations in pressure drop across the passage, the improvement therewith comprising: control means between said first face of the disc and the seat for effecting flexure of the disc such that flow through the grooves is gradually reduced sequentially whereby flow through the first of said grooves is fully curtailed at a different time relative to curtailment of flow through any one of the remainder of said grooves.

2. The invention of claim 1 wherein said control means comprises a plurality of protrusions between said first face and said seat, said protrusions are relatively spaced apart, and each is disposed along the perimeter of said disc and generally in between two of said edge grooves.

3. The invention of claim 1 wherein the control means includes an integral portion of said disc.

4. The invention of claim 1 wherein said control means comprises a plurality of spaced apart resilient pads located between said first face and said seat. said 5. The invention of claim 4 wherein each of said pads is of a different size than any other pad in said plurality so that flexure of said disc is directly effected by the degree and order of flexure of said pads.

6. The invention of claim 4 wherein the disposition of said spaced apart pads is a generally circumferential arrangement relative to said disc, said pads are generally of uniform size and shape, and the distance between adjacent pads is non-uniform whereby flexure of the disc is caused to be non-uniform.

7. The invention of claim 4 wherein each of said pads has a surface portion in contact with said seat, and the area of the surface portion of any one of said pads is different from the area of the surface portion of any of the other of said pads.

8. The invention of claim 4 whereby each of said pads has a thickness therethrough which is different from the thickness of any one of the other of said pads.

* * * * *